Feb. 12, 1924.
J. B. MILLER
HYDRAULIC MINERAL SEPARATOR
Filed May 10, 1923
1,483,371
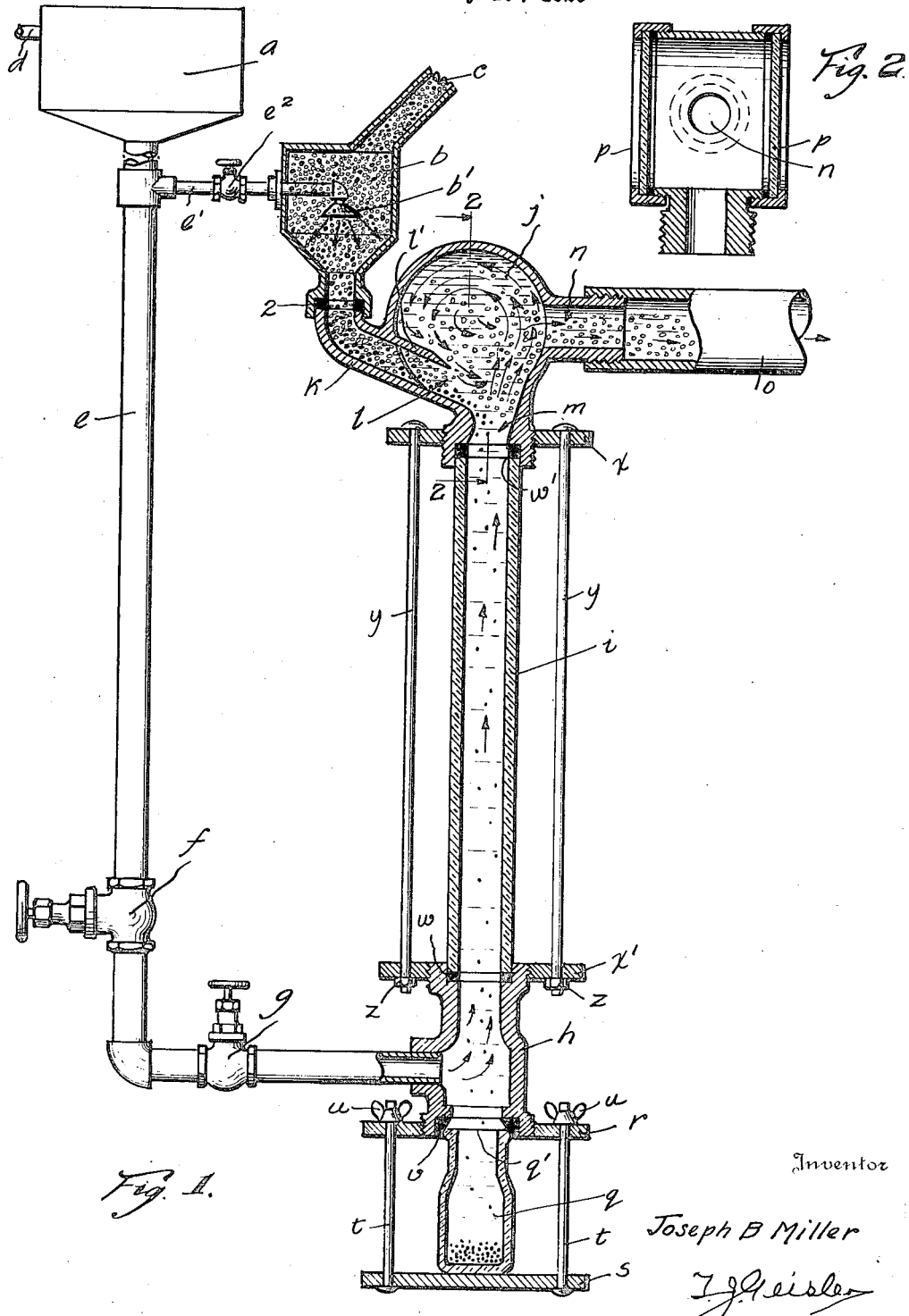

Patented Feb. 12, 1924.

1,483,371

UNITED STATES PATENT OFFICE.

JOSEPH B. MILLER, OF PORTLAND, OREGON, ASSIGNOR OF ONE-HALF TO EDWIN JACOBSON, OF PORTLAND, OREGON.

HYDRAULIC MINERAL SEPARATOR.

Application filed May 10, 1923. Serial No. 638,073.

*To all whom it may concern:*

Be it known that I, JOSEPH B. MILLER, a citizen of the United States, and a resident of Portland, county of Multnomah, and State of Oregon, have invented a new and useful Improvement in Hydraulic Mineral Separators, of which the following is a specification.

The object of my invention is to provide an efficient, simple device for separating precious metal from the other particles of comminuted ore in large quantities; in other words, on a commercial scale.

Since the particles of the minerals composing the comminuted ore have different specific gravities, the said separation may be effected in a volume of flowing water, in which the heavier particles will settle, while the lighter particles will be carried off with the flow.

But in order to effect such separation in a practical way, on a commercial scale, it is necessary to provide a suitable device operating on a correct principle. I attain my object in the following manner, that is to say:—By separating the particles of the precious metal from the other particles of the comminuted ore by agitating the latter in a confined space by means of a flowing column of water, the velocity of which is controlled, or adjusted to permit the heavier particles to settle in the water of the column, while at the same time the lighter particles are carried off with the flow of the water from said column.

To this end I have invented as practical and efficient means for carrying out my method into practice, the following device: A chamber of annular interior contour, in a vertical plane, is mounted on a stand-pipe connected with a head of water. Means are provided for controlling the flow thru the stand pipe, and other means are provided for introducing ore, preferably intermixed with water, into said chamber; the latter having an outlet for the flow from said stand-pipe.

The details of construction and operation of my invention are hereinafter more fully described with reference to the accompanying drawings, in which:

Fig. 1 is a diagrammatic view, partly in section, of my said device; and

Fig. 2 is a sectional detail on the line 2—2 of Fig. 1, of the mixing chamber, in which the comminuted ore is agitated by the flow of a column of water, thereby to effect the separation of the particles of precious metal by reason of the difference in specific gravities of the particles.

My device may consist of a storage tank for water, as *a*, for supplying a head of water, and a hopper *b* for the comminuted ore, which may be supplied from any convenient source, connected to the feed spout *c*. The tank *a* can be any convenient distance above the rest of the separating apparatus so as to provide a suitable head for the water. This tank is supplied thru a pipe *d*. It will be apparent that the supply of water may be from any convenient source of pressure, whether static or mechanical, and thus the pipe may be fixed to a pump and the pressure regulated by auxiliary devices. The tank *a* is connected with a flow pipe *e* which is controlled by a shut-off valve *f*. An auxiliary control valve *g* is provided which is normally left in set position, which fixes the amount of flow thru the pipe *e* when the valve *f* is open. I tap a pipe *e'* in the flow-pipe *e*, the flow thru which is controlled by an adjustable valve *e²*. This pipe has a sprinkler head *b'* which opens into the hopper *b*, and thus water from this sprinkler head *b'* wets the ore and metal particles in the hopper as they pass therethru. The pipe *e* is tapped into a T *h*, which connects with a stand-pipe *i*. The agitating head *j* is placed at the top of the stand-pipe *i* and connects with the hopper *b*. The hopper *b* is preferably arranged above the agitating head so that its contents of mixed ore and metal will feed into the agitating head by gravity. The connecting pipe *k* between the hopper and the agitating head is therefore preferably inclined downwardly and its opening *l* is to one side of the opening *m* for the mixing tube *i*. The opening *l* is also provided with a projecting flange *l'* which covers the opening from above. The opening *m* is inclined towards the side away from the outlet *l* as shown in Fig. 1 and thus the stream of water emitted from the stand-pipe is thrown up the right hand side of the agitating head and is swirled about the top and strikes the projecting lip *l'* of the outlet *l*. This causes the water to be thrown towards the outlet *n* which connects with the overflow pipe o. The agitating head is preferably built with transparent heads p so that the action therein may be better observed. I provide a receptacle q at the bottom of the T h which is held in position between clamping flanges r and s which are drawn together by screws t having wing nuts u. A gasket v is provided so as to make a water tight connection between the mouth q' of the receptacle q and the T h. I provide gaskets w and w' on each end of the stand-pipe i so as to provide a similar tight connection. I provide clamping flanges x and x' on the agitating head and the T h, respectively, which holds these members in fixed relationship and which are drawn together by rods y which have nuts z affixed thereon. I provide a gasket 2 between the hopper b and its connecting pipe k so as to prevent leakage between these parts.

The operation of my device is as follows: Water under a fixed head and a fixed volume is delivered to the pipe e and the T h. This water is directed upwardly thru the stand pipe from which it enters the agitating head j. The stream of water passes by the mouth of the outlet l and forces some of the mixed ore and metal particles into the agitating chamber where they are separated from each other. The ore being lighter in specific gravity than the metal is forced upwardly by the stream of water and is thrown out thru the discharge opening n into the pipe o. The metal particles being heavier will settle downwardly against the velocity of the moving stream of water and will fall thru the stand pipe i and into the container q. The velocity of the water passing upwardly in the pipe is regulated so that it will slightly more than counteract particles having a specific gravity of the ore, but which will be insufficient to counteract particles of metal which have a heavier specific gravity. It is necessary, by my invention, that the metal and ore be comminuted or granular so that the particles do not contain part ore and part metal, and are approximately the same size.

I have determined by experimentation that if the ore is delivered to the mixing chamber with the particles of metal of such small size so as to have almost negligible weight, such as for example, flour gold, the action of my device is reversed, and these small particles will be floated off instead of the ore. If the metal is in this condition I reverse my device and regulate the velocity of the stream passing upwardly, so as to permit the ore to settle thru the mixing pipe i and cause the light particles of metal to be washed off thru the overflow pipe o from which they are collected.

The mechanism I have shown in the accompanying drawings is merely one form which I have used for demonstration and I do not wish to be confined to the structure shown by me, but to include within the scope of my device any structure which embodies the described principle of operation of my device.

I claim:

1. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, said throat being deflected from the longitudinal axis of the stand-pipe towards one of said interior concaved wall-surfaces, a mineral hopper having a spout discharging into one side of said agitation-head, the agitation-head having an outlet in its wall side opposite to the inlet from said spout.

2. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout.

3. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout, such discharge outlet lying in a higher plane than the orifice at the discharge end of said spout.

4. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, said throat being deflected from the longitudinal axis of the stand-pipe towards one of said interior concaved wall-surfaces, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout, such discharge outlet lying in a higher plane than the orifice at the discharge end of said spout.

5. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, said throat being deflected from the longitudinal axis of the stand-pipe towards one of said interior concaved wall-surfaces, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout, such discharge outlet lying in a higher plane than the orifice at the discharge end of said spout.

6. A hydraulic mineral separator comprising a stand-pipe of uniform cross section, a connection to the bottom of the said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, said throat being deflected from the longitudinal axis of the stand-pipe towards one of said interior concaved wall surfaces, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout, such discharge outlet lying in a higher plane than the orifice at the discharge end of said spout, and means for admitting water into said mineral hopper.

7. A hydraulic mineral separator comprising a stand-pipe of uniform cross section, a connection to the bottom end of said stand-pipe from a head of water, means for controlling the flow thru such connection, an agitation-head mounted on the upper end of said stand-pipe, such head provided with a chamber having its interior wall-surfaces concaved in a vertical plane, the lower end of said agitation-head having a throat connecting with the top of said stand-pipe, said throat being deflected from the longitudinal axis of the stand-pipe towards one of said interior concaved wall-surfaces, a mineral hopper having a spout discharging into one side of said agitation-head, the discharge orifice of said spout being provided with an overhanging ledge, the longitudinal axis of said spout, and said ledge being inclined towards said throat, the agitation-head having an outlet in its wall side opposite to the inlet from said spout, such discharge outlet lying in a higher plane than the orifice at the discharge end of said spout, valve controlled means for admitting water into said mineral hopper, such means also being supplied by said connection from the head of water, a valve controlling the diversion of water from said connection into said hopper.

JOSEPH B. MILLER.